R. W. PADDEN.
VEHICLE WHEEL.
APPLICATION FILED SEPT. 20, 1919.
1,393,694. Patented Oct. 11, 1921.
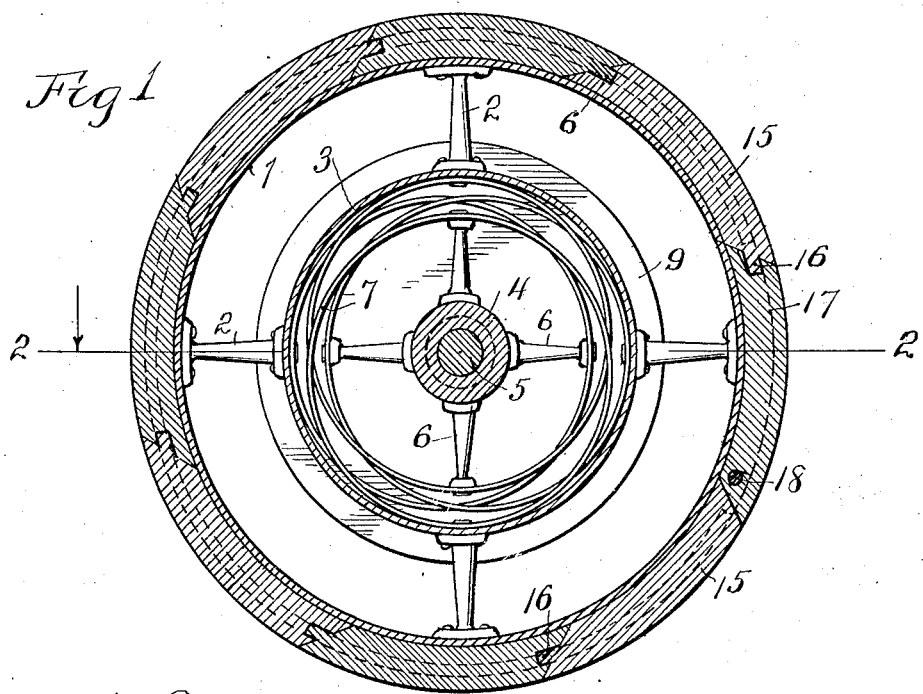
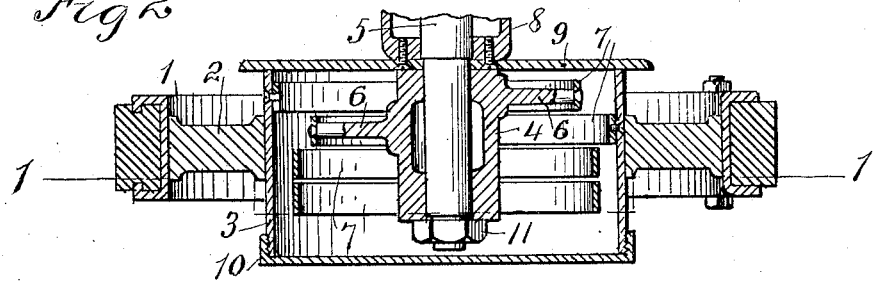
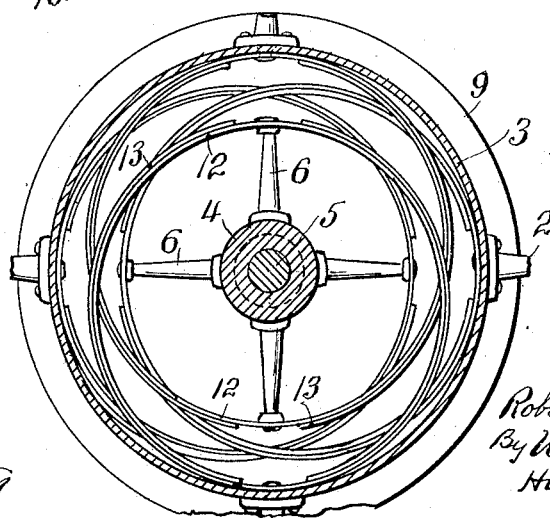
Witness:
R. E. Hamilton
Inventor,
Robert W. Padden
By Warren D. House
His Attorney

UNITED STATES PATENT OFFICE.

ROBERT W. PADDEN, OF KANSAS CITY, MISSOURI.

VEHICLE-WHEEL.

1,393,694.      Specification of Letters Patent.      Patented Oct. 11, 1921.

Application filed September 20, 1919. Serial No. 325,137.

*To all whom it may concern:*

Be it known that I, ROBERT W. PADDEN, a citizen of the United States, residing at Kansas City, in the county of Jackson and State of Missouri, have invented a certain new and useful Improvement in Vehicle-Wheels, of which the following is a specification.

My invention relates to improvements in vehicle wheels.

The object of my invention is to provide a vehicle wheel which is simple in construction, cheaply manufactured, durable, not liable to get out of order and which will be easy riding and will eliminate the use of an inflatable tire.

A further object of my invention is to provide a vehicle wheel with a novel tire and with novel means for releasably affixing the tire to the rim.

The novel features of my invention are hereinafter fully described and claimed.

In the accompanying drawing, which illustrates the preferred embodiment of my invention, Figure 1 is a vertical sectional view on the line 1—1 of Fig. 2, showing my improved wheel.

Fig. 2 is a horizontal sectional view on the line 2—2 of Fig. 1.

Fig. 3 is a vertical sectional view, partly broken away, of a modified form of my invention.

Similar reference characters designate similar parts in the different views.

1 designates an outer rim connected by radial spokes 2 with an inner rim 3.

4 designates a hub which is rotatable on an axle 5 and which is provided with radial spokes 6 respectively located in different parallel vertical planes.

7 designates substantially circular springs which are respectively attached at their inner sides to the spokes 6, and which are attached at their outer sides to the inner side of the inner rim 3 at points respectively substantially diametrically opposite to the spokes 6 to which the springs are attached. 8 designates a casing encircling the axle and having attached to it a circular plate 9 which closes the inner end of the inner rim 3. The outer end of the rim 3 is screw threaded and has removably fitted thereon a cap 10. A nut 11 mounted on the outer end of the axle 5 holds the hub on the axle.

The rim 3, plate 9 and cap 10 form a housing for the springs 7.

As the springs are attached at different circumferential points on the rim 3 and the hub, each spring is vertically expanded and then compressed in a vertical direction as the wheel revolves. The substantially circular form of the springs afford great driving power and strength while at the same time affording great resiliency and non-liability to breakage or distortion.

In the form shown in Fig. 3 each spring comprises two transversely divided resilient rings 12 and 13, the rings 12 being fitted within the rings 13 and attached to the spokes 6 respectively, the outer rings 13 being attached at different radial points to the inner periphery of the rim 3. This construction affords the resiliency and strength of leaf springs.

The rim 1 has a channel on its periphery, the sides of the channel being provided respectively with two oppositely disposed arcuate inwardly extending flanges 14 which are spaced apart at their ends for the insertion and removal of arcuate tire sections 15, each of which is provided at opposite sides with curved grooves adapted to respectively receive the flanges 14. Each tire section 15 is provided at one end with a tongue 16 and at its other end with a recess, said tongue and recess being adapted to be fitted to the recess and tongue of the next adjacent sections.

17 designates a tire section adapted to fill the space between the ends of the flanges 14 and between the sections 15. The section 17 is provided at one end with a recess adapted to receive the tongue of one of the adjacent sections 15. A bolt 18 may be extended removably through the section 17 and the sides of the rim 1 for releasably holding the section 17 attached to the rim 1. The bolt 18 may have the usual nut 19.

Preferably my improved tire is composed of waste rubber, wood pulp and paper, these ingredients being preferably intermingled and compressed. They may, however, be assembled in alternating layers of paper, wood pulp and soft rubber, the rubber layer being the exterior one.

To remove the sections of the tire, the bolt 18 is first removed, after which the section 17 may be removed, following which the sections 15 may be consecutively slid on the flanges 14 to the open place between the ends of the flanges and then removed, the said space being sufficiently long to enable this to be done. To insert the sections, the operation just described is reversed.

I do not limit my invention to the structure shown and described, as modifications, within the scope of the appended claims, may be made without departing from the spirit of my invention.

What I claim is:—

1. In a vehicle wheel, an outer rim, an inner rim, a hub, spokes connecting the outer rim with the inner rim, spokes extending radially in different vertical planes from the hub, and parallel springs in different vertical planes and respectively attached to the last named spokes and bearing against the inner rim at points substantially diametrically opposite to the spokes to which the springs are respectively attached.

2. In a vehicle wheel, an outer rim, an inner rim, a hub, spokes extending radially in different parallel planes from the hub, substantially circular parallel springs respectively attached to said spokes and bearing against the inner rim at points substantially diametrically opposite to the spokes to which the springs are respectively attached, and spokes connecting the outer and inner rims.

3. In a vehicle wheel, an outer rim, an inner rim, a hub, spokes extending radially from the hub, substantially circular springs respectively attached to said spokes and attached to the inner rim at points substantially diametrically opposite to the spokes to which the springs are respectively attached, each spring comprising two resilient rings, one of which is transversely divided, one ring being fitted within the other, and spokes connecting the inner and outer rims.

4. In a vehicle wheel, an outer rim, an inner rim, a hub, spokes extending radially from the hub, substantially circular springs, each comprising two resilient transversely divided rings fitted one within the other, one ring of each spring being attached to a spoke and the other ring of the spring being attached to the inner rim substantially diametrically opposite to said spoke, and spokes connecting the inner and outer rims.

5. In a vehicle wheel, a rim, a hub, spokes extending radially in different parallel planes from the hub, and springs respectively bearing on the spokes and bearing on the rim at points substantially diametrically opposite to the spokes on which the springs bear.

6. In a vehicle wheel, a rim, a hub, spokes extending radially in different parallel planes from the hub, and substantially circular springs respectively bearing on the spokes and bearing on the rim at points substantially diametrically opposite to the spokes on which the springs bear.

7. In a vehicle wheel, a rim, a hub, spokes extending radially from the hub, and substantially circular springs, each comprising two resilient transversely divided rings fitted one within the other, one ring of each spring being attached to a spoke and the other ring of the spring being attached to the rim substantially diametrically opposite to the spoke.

8. In a vehicle wheel, a rim, a hub, and substantially circular springs, each comprising two resilient transversely divided rings fitted one within the other, one set of rings being attached at different radial points respectively to the hub, the other set of rings being attached to the inner rim substantially diametrically opposite to the points at which the other set of rings are attached to the hub.

In testimony whereof I have signed my name to this specification.

ROBERT W. PADDEN.